UNITED STATES PATENT OFFICE.

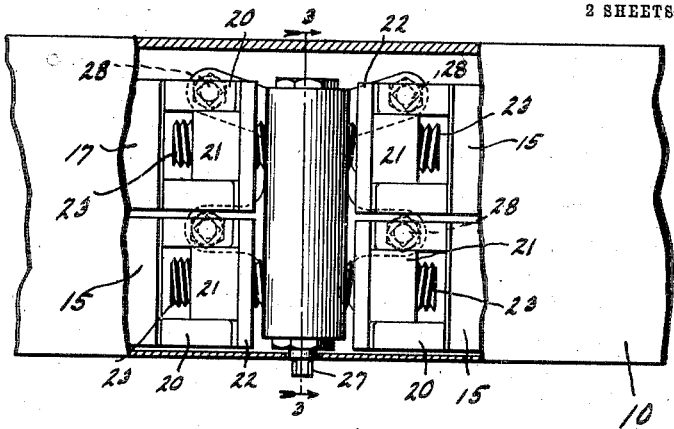
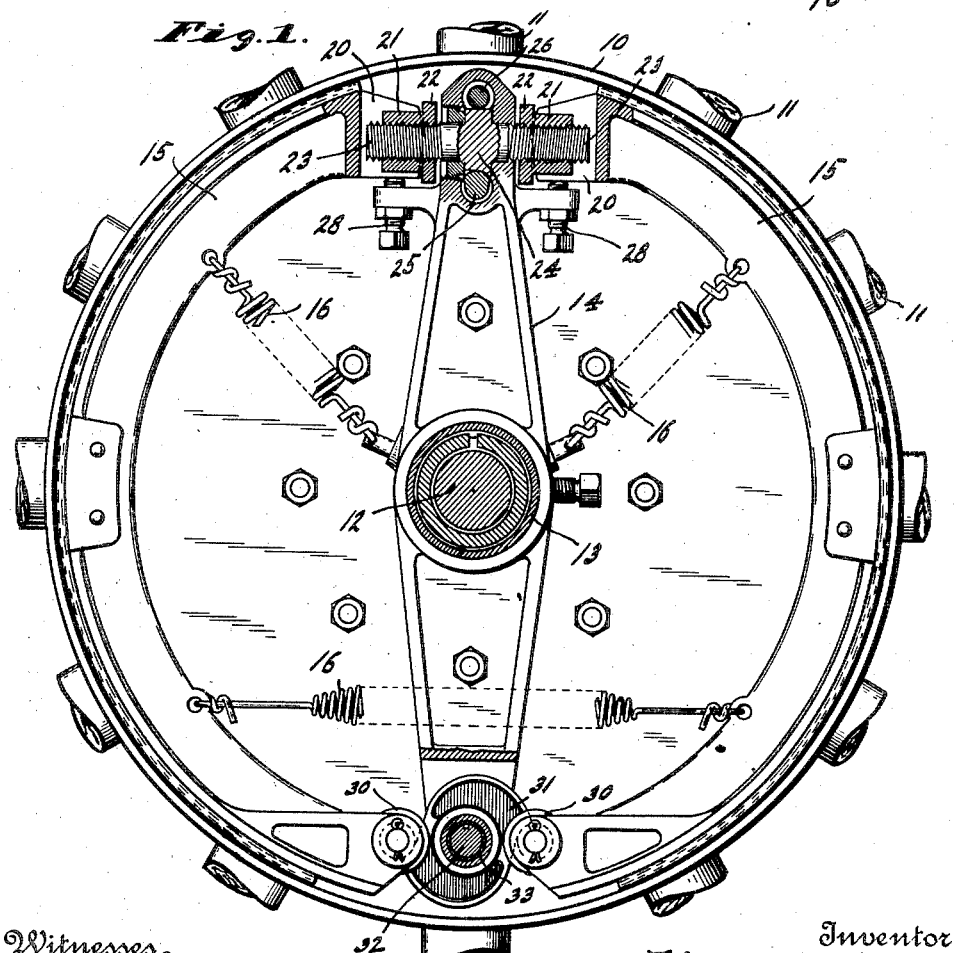

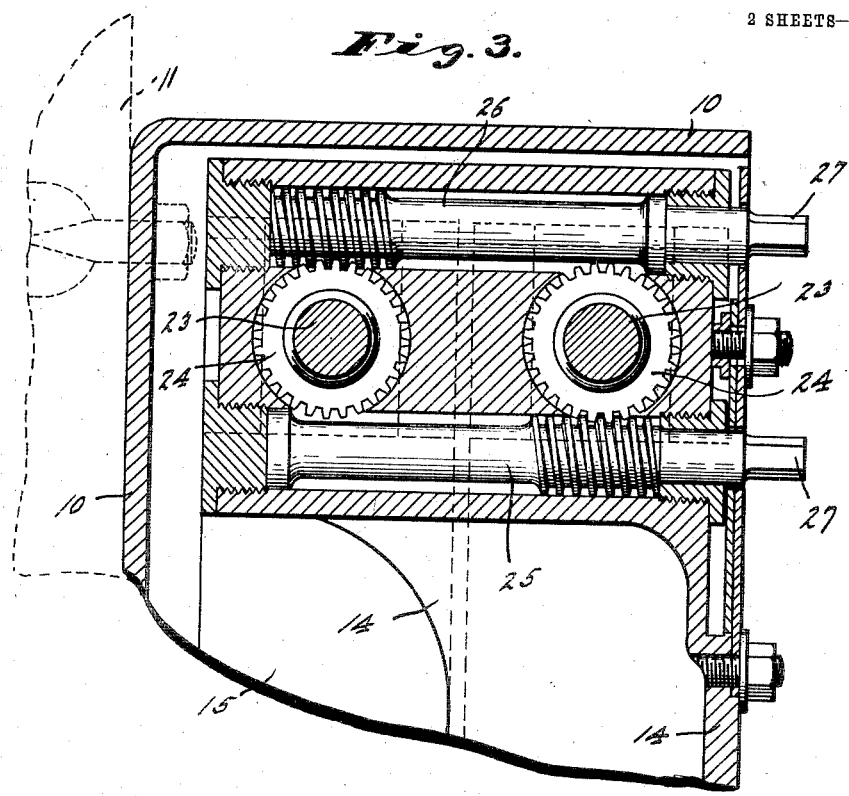

HOWARD C. MARMON, OF INDIANAPOLIS, INDIANA, ASSIGNOR TO NORDYKE & MARMON COMPANY, OF INDIANAPOLIS, INDIANA, A CORPORATION OF INDIANA.

BRAKE.

1,078,600.  Specification of Letters Patent.  Patented Nov. 11, 1913.

Application filed August 1, 1912. Serial No. 712,719.

*To all whom it may concern:*

Be it known that I, HOWARD C. MARMON, a citizen of the United States, residing at Indianapolis, in the county of Marion and State of Indiana, have invented a new and useful Brake, of which the following is a specification.

It is the object of my invention to provide a more convenient and efficient adjusting mechanism for internal expanding brakes, and to improve generally the construction of such brakes. To this end I mount the brake shoes within a brake drum so that at one they may be spread apart or allowed to approach each other to set the brake or release it, and at the other may be permanently adjusted to different distances apart to provide the desired adjustment, the brake shoes at this latter end being mounted so that they have a rolling motion on their support.

The accompanying drawings illustrate my invention.

Figure 1 is an end elevation of the brake, with the cover plate removed and some parts in section; Fig. 2 is a partial edge view of the brake drum, with the drum partially broken away to show the adjusting means; and Fig. 3 is an enlarged section on the line 3—3 of Fig. 2.

The brake drum 10 is rigidly connected to a vehicle wheel, the spokes 11 of which are shown in part in Fig. 1, the wheel shown being driven from the usual driving shaft 12. On the fixed axle structure 13 surrounding the shaft 12 is fixed a frame 14, which carries the internal brake shoes 15. Each of these shoes is located in close proximity to the inner surface of the drum 10, and extends nearly 180°. There are two pairs of brake shoes 15, as indicated in Fig. 2, the two shoes of a pair being in the same plane and together with their operating and adjusting mechanism extending completely around the inside of the frame 10. The two shoes 15 of a pair are drawn toward each other by suitable springs 16. One end of each shoe 15 is bifurcated, the prongs 20 thereof straddling the body of a nut 21 and at their ends, which are rounded, bearing against a flange 22 of such nut. The nuts 21 for the two shoes of a pair are respectively provided with right and left hand threads, which coöperate with right and left hand threads on a double-ended screw 23 provided with a worm gear 24 between its two threaded ends and suitably mounted in one end of the frame 14. There being two pairs of shoes 15, there are two screws 23, one for each pair, as indicated in Figs. 2 and 3. Worms 25 and 26 coöperate with the two worm gears 24 respectively, such worms being transversely mounted in the same end of the frame 14 which carries the screws 23 and having projecting squared ends 27 whereby they may be turned by a suitable key. The two worms 25 and 26 are preferably made interchangeable. By turning the worm 25 or 26, the coöperating screw 23 is also turned, thus forcing apart or drawing together the two nuts 21 coöperating with said screw and spreading apart or allowing to come closer the two ends of the pair of shoes 15 which coöperate with such nuts. The prongs 20 may be adjusted transversely across the nuts 21 by adjusting screws 28 carried by the frame 14, whereby the corresponding ends of the shoes 15 may be moved toward or from the drum 10.

The ends of the shoes 15 opposite the prongs 20 are provided with rollers 30, the two rollers on each pair of shoes coöperating with a cam 31. The two cams 31, for the two pairs of shoes, are carried by a shaft 32 and a concentric sleeve 33 respectively, such shaft and sleeve being connected by suitable connecting means to the usual hand brake lever and foot brake lever respectively. By turning the shaft 32 or sleeve 33, the coöperating cam 31 is turned and the rollers 30 of one pair of brake shoes are forced apart or allowed to approach each other, thus either forcing the shoes 15 against the inner surface of the drum 10 or allowing such shoes to be drawn by the springs 16 away from such surface. If the setting of the brakes produced by the operation of the cam 31 is too weak or too strong, proper adjustment is obtained by turning the proper worm 25 or 26 to separate or draw together the coöperating nuts 21. If the shoes 15 bear more strongly against the drum at one end than at the other, the screws 28 are properly adjusted to equalize the pressure at the two ends.

I claim as my invention:

1. An internal expanding brake, comprising the combination of a drum for connection to a rotary member, a pair of arc-shaped brake shoes which coöperate with the inner surface of said drum, means for moving one pair of adjacent ends of said shoes relatively to each other to produce setting or releasing of the brakes, and means for moving the other pair of adjacent ends of said shoes relatively to each other for adjusting the braking effect of the movement produced by the first named means, said second pair of adjacent ends having a shiftable abutting bearing on their adjusting means so that they may move thereon transversely of the adjustment provided thereby when the shoes are moved by the first named means.

2. An internal expanding brake, comprising the combination of a drum for connection to a rotary member, a stationary frame, a pair of arc-shaped brake shoes coöperating with the inner surface of said drum and carried by said frame, a cam carried by said frame and acting on one pair of adjacent ends of said brake shoes to move the latter relatively to each other to set and release the brakes, and means carried by said frame and coöperating with the other pair of adjacent ends of said brake shoes to move them relatively to each other to vary the braking effect produced by a predetermined movement of said cam, said second pair of adjacent ends having a shiftable abutting bearing on their adjusting means so that they may move thereon transversely of the adjustment provided thereby when the shoes are moved by the first named means.

3. An internal expanding brake, comprising the combination of a drum for connection to a rotary member, a pair of arc-shaped brake shoes coöperating with the inner surface of said drum, means coöperating with one pair of ends of said brake shoes to move them relatively to each other to set and release the brakes, a pair of members against which the other pair of ends of said brake shoes bear, means for moving said members relatively to each other, and means for adjusting toward and from the brake drum in a direction transverse to the relative movement between said two members the ends of the brake shoes which coöperate with said members.

4. An internal expanding brake, comprising the combination of a drum for connection to a rotary member, a pair of arc-shaped brake shoes coöperating with the inner surface of said drum, means coöperating with one pair of ends of said brake shoes to move them relatively to each other to set and release the brakes, a pair of members against which the other pair of ends of said brake shoes bear, means for moving said members relatively to each other, and means for adjusting across said members toward and from the brake drum the coöperating ends of the brake shoes.

5. An internal expanding brake, comprising the combination of a drum for connection to a rotary member, a pair of arc-shaped brake shoes coöperating with the inner surface of said drum, means coöperating with one pair of ends of said brake shoes to move them relatively to each other to set and release the brakes, a pair of members against which the other pair of ends of said brake shoes bear, and means for moving said members relatively to each other, said members and said brake shoes having a shiftable abutting engagement with each other.

6. An internal expanding brake, comprising the combination of a drum for connection to a rotary member, a pair of arc-shaped brake shoes coöperating with the inner surface of said drum, means coöperating with one pair of ends of said brake shoes to move them relatively to each other to set and release the brakes, a pair of members against which the other pair of ends of said brake shoes bear, means for moving said members relatively to each other, said members and said brake shoes having a shiftable abutting engagement with each other, and means for adjusting across said members toward and from the brake drum the coöperating ends of the brake shoes.

7. An internal expanding brake, comprising a drum for connection to a rotary member, a pair of brake shoes coöperating with the inner surface of said drum, means for moving one pair of ends of said brake shoes relatively to each other to set and release the brake, a pair of nuts against which the other ends of said brake shoes bear, a right and left hand screw with the two threads of which said nuts respectively coöperate, and means for turning said screw.

8. An internal expanding brake, comprising a drum for connection to a rotary member, a pair of brake shoes coöperating with the inner surface of said drum, means for moving one pair of ends of said brake shoes relatively to each other to set and release the brake, a pair of nuts against which the other ends of said brake shoes bear, a right and left hand screw with the two threads of which said nuts respectively coöperate, a worm gear carried by said screw, and a worm coöperating with said worm gear.

9. An internal expanding brake, comprising the combination of a drum for connection to a rotary member, a plurality of pairs of arc-shaped brake shoes coöperating with the inner surface of said drum, means for moving relatively to each other one pair of ends of each pair of brake shoes to set and release the brake, a frame, a pair of parallel screws mounted in said frame, each of said screws having right and left hand threads, a pair of nuts coöperating with each of said screws and forming abutments for the other ends of said brake shoes, worm gears carried by said screws respectively, and a pair of parallel worms coöperating with said worm gears respectively.

10. An internal expanding brake, comprising the combination of a drum for connection to a rotary member, a plurality of pairs of arc-shaped brake shoes coöperating with the inner surface of said drum, means for moving relatively to each other one pair of ends of each pair of brake shoes to set and release the brake, a frame, a pair of parallel screws mounted in said frame, each of said screws having right and left hand threads, and a pair of nuts coöperating with each of said screws and forming abutments for the other ends of said brake shoes.

11. An internal expanding brake, comprising the combination of a drum for connection to a rotary member, a pair of arc-shaped brake shoes coöperating with the inner surface of said drum, means coöperating with one pair of ends of said brake shoes to move them relatively to each other to set and release the brakes, a pair of members against which the other pair of ends of said brake shoes bear, means for moving said members relatively to each other, said members and said brake shoes having a shiftable abutting engagement with each other, and means for adjusting toward and from the brake drum in a direction transverse to the relative movement between said two members the ends of the brake shoes which coöperate with said members.

In witness whereof I have hereunto set my hand and seal at Indianapolis, Indiana, this 25th day of July, A. D., one thousand nine hundred and twelve.

HOWARD C. MARMON. [L. S.]

Witnesses:
   FRANK A. FAHLE,
   JOSEPHINE GASPER.